(12) United States Patent
Mizutani

(10) Patent No.: US 7,307,789 B2
(45) Date of Patent: Dec. 11, 2007

(54) PHOTOELECTRIC ENCODER

(75) Inventor: Miyako Mizutani, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 23 days.

(21) Appl. No.: 11/371,759

(22) Filed: Mar. 9, 2006

(65) Prior Publication Data
US 2006/0202112 A1    Sep. 14, 2006

(30) Foreign Application Priority Data
Mar. 11, 2005  (JP) ............................. 2005-069579

(51) Int. Cl.
*G02B 27/10* (2006.01)
(52) U.S. Cl. ................. 359/619; 250/231.13
(58) Field of Classification Search ........ 359/618–619; 250/231.13, 231.14
See application file for complete search history.

(56) References Cited

U.S. PATENT DOCUMENTS 5,067,816 A * 11/1991 Ichikawa ................... 356/619
7,186,969 B2 * 3/2007 Shimomura et al. ... 250/231.13

* cited by examiner

*Primary Examiner*—Alicia M Harrington
(74) *Attorney, Agent, or Firm*—Rankin, Hill, Porter & Clark LLP

(57) ABSTRACT

A photoelectric encoder is provided which has an optical system including a first lens array inserted between a main scale and a light receiving element. An image divided or reversed by the first lens array can be electrically or optically re-reversed. This can achieve the reduction of the entire size as well as increase in the scale field of view, while maintaining the image shape and/or pattern.

12 Claims, 26 Drawing Sheets

Image is divided and reversed in each separate lens

PRIOR ART

Image is re-reversed by connection change

Image is re-reversed by connection change

PHOTOELECTRIC ENCODER

CROSS-REFERENCE TO RELATED APPLICATION

The disclosure of Japanese Patent Application No. 2005-69579 filed on Mar. 11, 2005 including specifications, drawings and claims is incorporated herein by reference in its entirety.

BACKGROUND OF THE INVENTION

1. Field of the Invention

The present invention relates to a photoelectric encoder. In particular, the invention relates to improvements in a photoelectric encoder that has a telecentric optical system wherein a lens and an aperture are inserted between a main scale and a light receiving element.

2. Description of the Related Art

As described in Japanese Patent Laid-Open Publication No. 2004-264295 and as shown in FIG. 1, a photoelectric encoder is designed in which a lens optical system (telecentric optical system) 40, comprising a lens 42 and an aperture 44 that functions as a telecentric optical diaphragm, is inserted between a main scale 20 and a light receiving element array 34 constituting a light receiving unit 30, for example, and as shown in FIG. 2 this lens optical system can set the magnification by adjusting the distances a and b between the lens 42 and the scale 21 of the main scale 20 and between the lens 42 and the light receiving element 35 on the light receiving element array 34, respectively. In FIG. 1, the reference numeral 10 denotes a light source and the reference symbol f denotes a focal length of the lens 42.

In the photoelectric encoder that uses this telecentric optical system 40, an image on the main scale 20 is made pass through the lens optical system (42, 44) and is projected onto the light receiving element array 34. Here, by positioning the aperture 44 at the focal position of the lens 42, even when the distance (gap) between the main scale 20 and the lens 42 changes, fluctuations in the magnification of the image formed on the light receiving element array 34 can be controlled if the positional relationship between the lens 42, the aperture 44, and the light receiving element array 34 does not change.

In particular, when the lens array 46 is used as the lens 42 as shown in FIG. 3 (light path view) and FIG. 4 (perspective view), the entire size can be made smaller and the scale field of view (FOV) can be increased.

As shown in FIG. 3 and FIG. 5, however, when a photoelectric encoder employs the lens array 46, there was a problem in which the image was divided and reversed in each single lens optical system.

This is a problem with not only image patterns but is an especially serious problem with absolute types which are required to reproduce accurate shapes.

SUMMARY OF THE INVENTION

In view of the foregoing problems, various embodiments of this invention provide an incremental type photoelectric encoder that can maintain image patterns (a first object).

Furthermore, various embodiments of this invention also provide a photoelectric encoder that can maintain not only image patterns but also shapes (a second object).

The present invention achieves the first object by providing an incremental type photoelectric encoder that has a first lens array inserted between a main scale and a light receiving element, and wherein pitches of the respective lenses are brought into agreement with a period of the main scale or natural number multiple thereof.

The present invention achieves the second object by providing a photoelectric encoder that has a first lens array inserted between a main scale and a light receiving element, and wherein a second lens array with a set pitch of lenses identical to the first lens array, and a third lens array that optically re-reverses the light emitted from the second lens array are provided.

The focal position of each lens of the third lens array is smaller than the focal position of each lens of the first and second lens array to shorten the entire optical length.

The present invention also achieves the second object by providing a photoelectric encoder that has a first lens array inserted between a main scale and a light receiving element, and wherein connection of outputs of a light receiving element array is changed to electrically re-reverse an image that has been divided and reversed by the first lens array.

The present invention achieves the second object by providing a photoelectric encoder that has a first lens array inserted between a main scale and a light receiving element, and wherein a second lens array with a set pitch of lenses identical to the first lens array, and a plurality of small mirrors with a set pitch identical to that of respective lenses of the first lens array are provided to optically re-reverse an image that has been divided and reversed by the first lens array, by the small mirrors.

The present invention achieves the second object by providing a photoelectric encoder that has a first lens array inserted between a main scale and a light receiving element, and wherein a second lens array with a set pitch of lenses identical to the first lens array, a mirror for making light emitted from the second lens array again be incident on the second lens array, and a half mirror for extracting the light passing through the first and second lens arrays towards a direction of the light receiving element are provided to optically re-reverse an image that has been divided and reversed by the first lens array, by the mirror.

The lens array may be a two-dimensional lens array to perform two-dimensional measurements.

Further, aperture may be provided at focal position of each lens to cut light from neighbor lens.

According to the present invention, image patterns in an incremental type photoelectric encoder can be maintained by bringing the set pitches of respective lenses of a lens array into agreement with the period of the main scale or natural number multiple thereof.

Image shapes can also be maintained by electrically or optically re-reversing the image reversed by a lens array. The photoelectric encoder can be applied not only to incremental types but also to absolute types.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

In the following, embodiments of the present invention will be described in detail with reference to the drawings.

Figure 1:
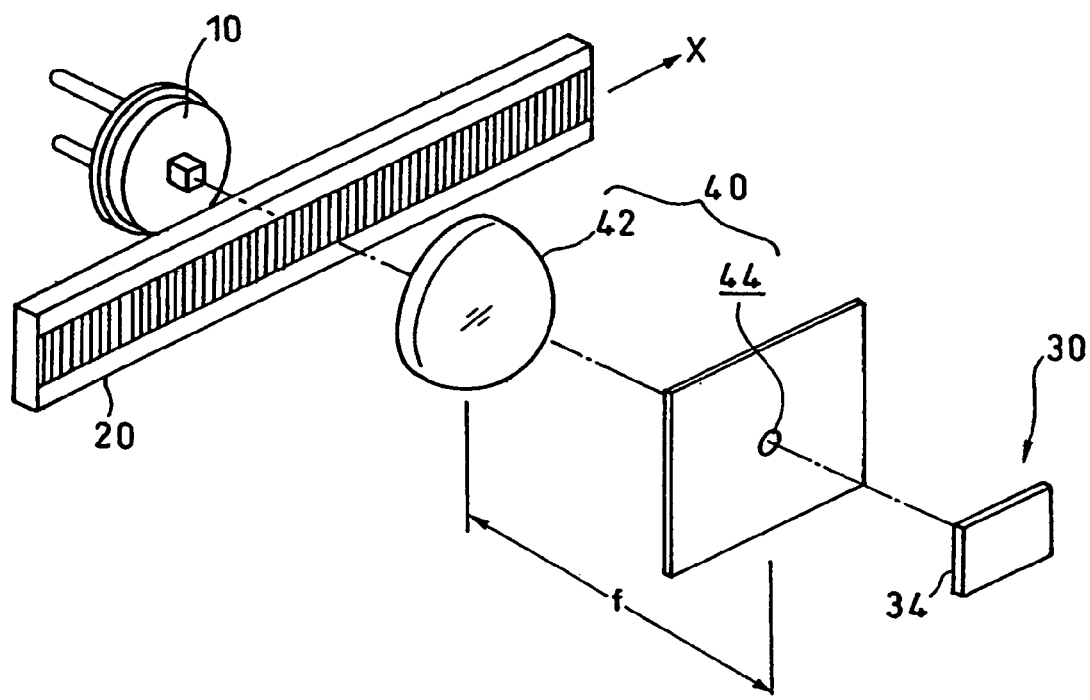
FIG. 1 is a perspective view showing the essential components of a photoelectric encoder that uses a telecentric optical system.
Figure 2:
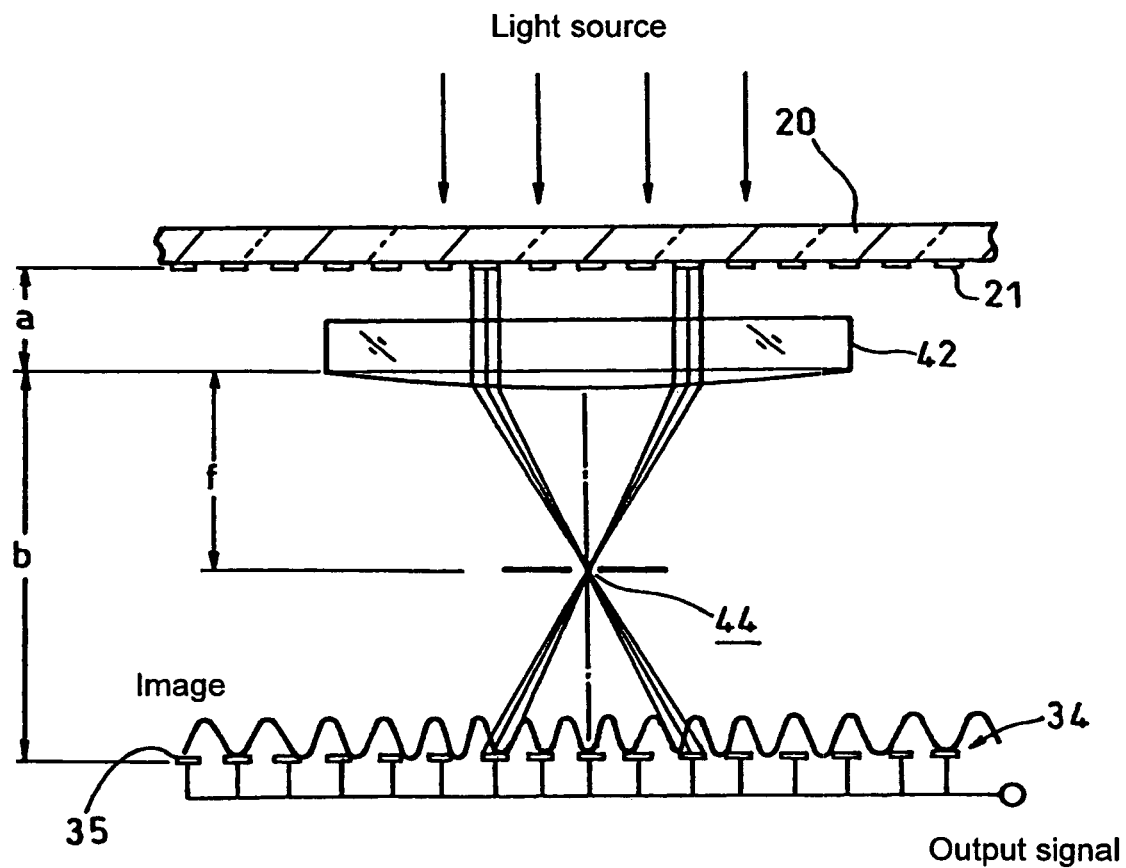
FIG. 2 is a plan view of the same photoelectric encoder.
Figure 3:
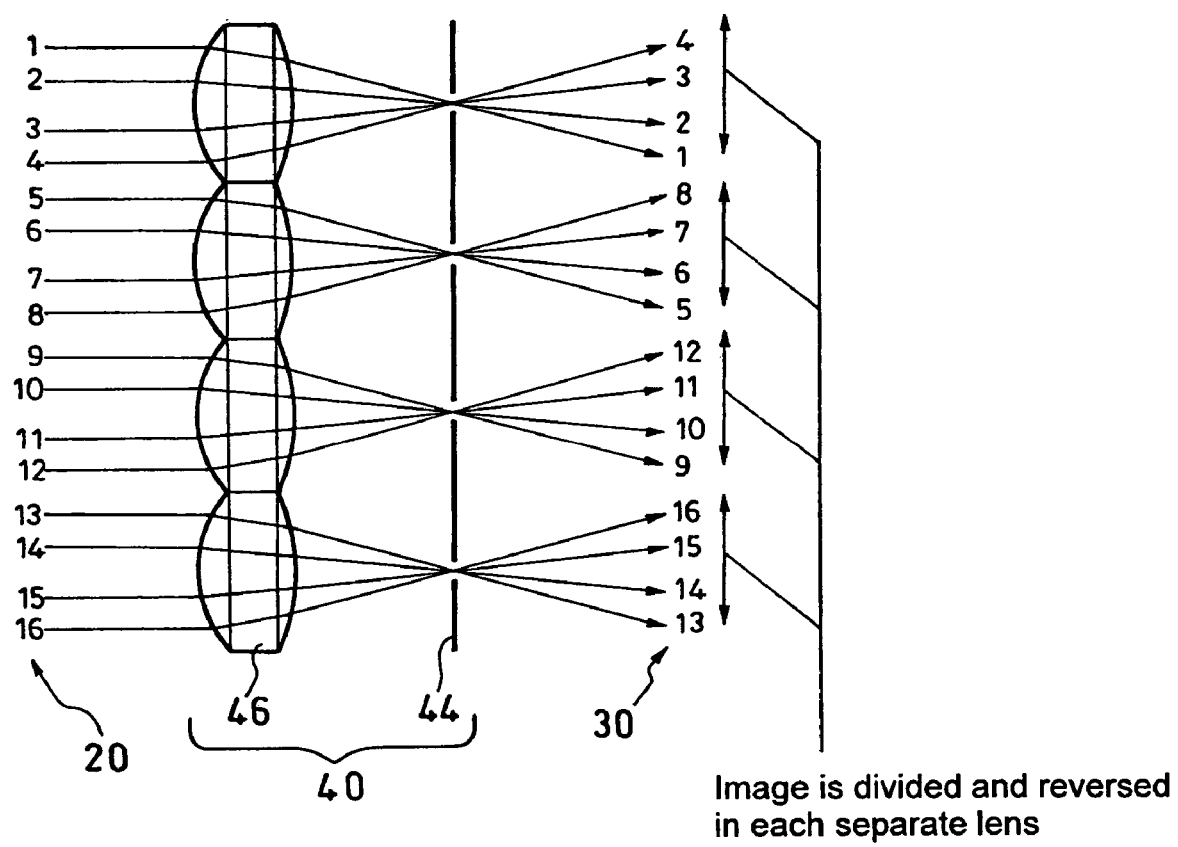
FIG. 3 is a light path view showing conventional problems.
Figure 4:
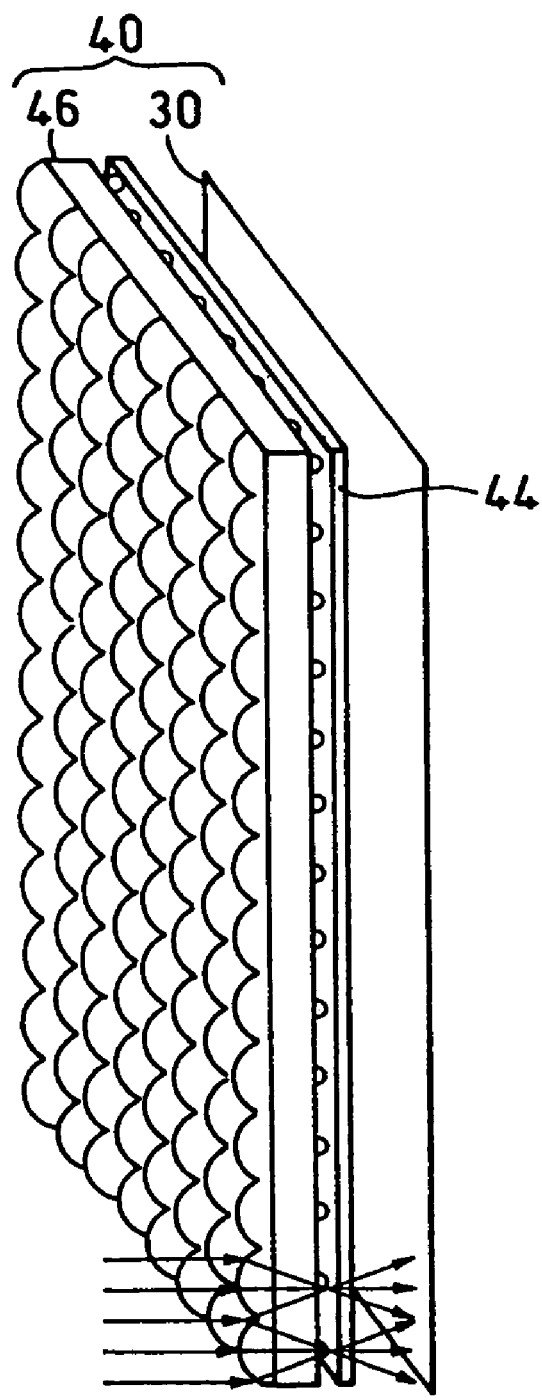
FIG. 4 is a perspective view of FIG. 3.
Figure 5:
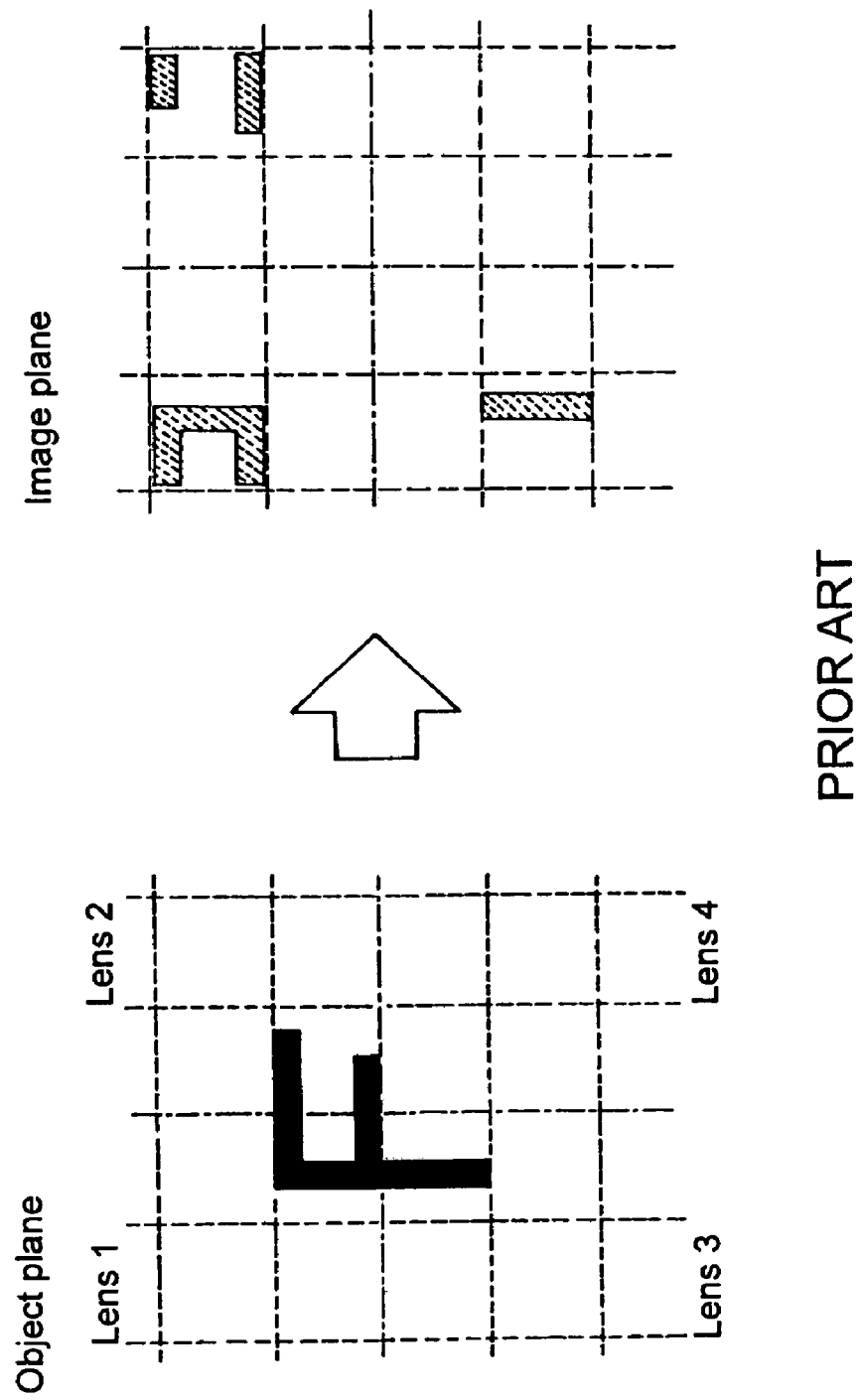
FIG. 5 is a plan view of FIG. 3.
Figure 6:
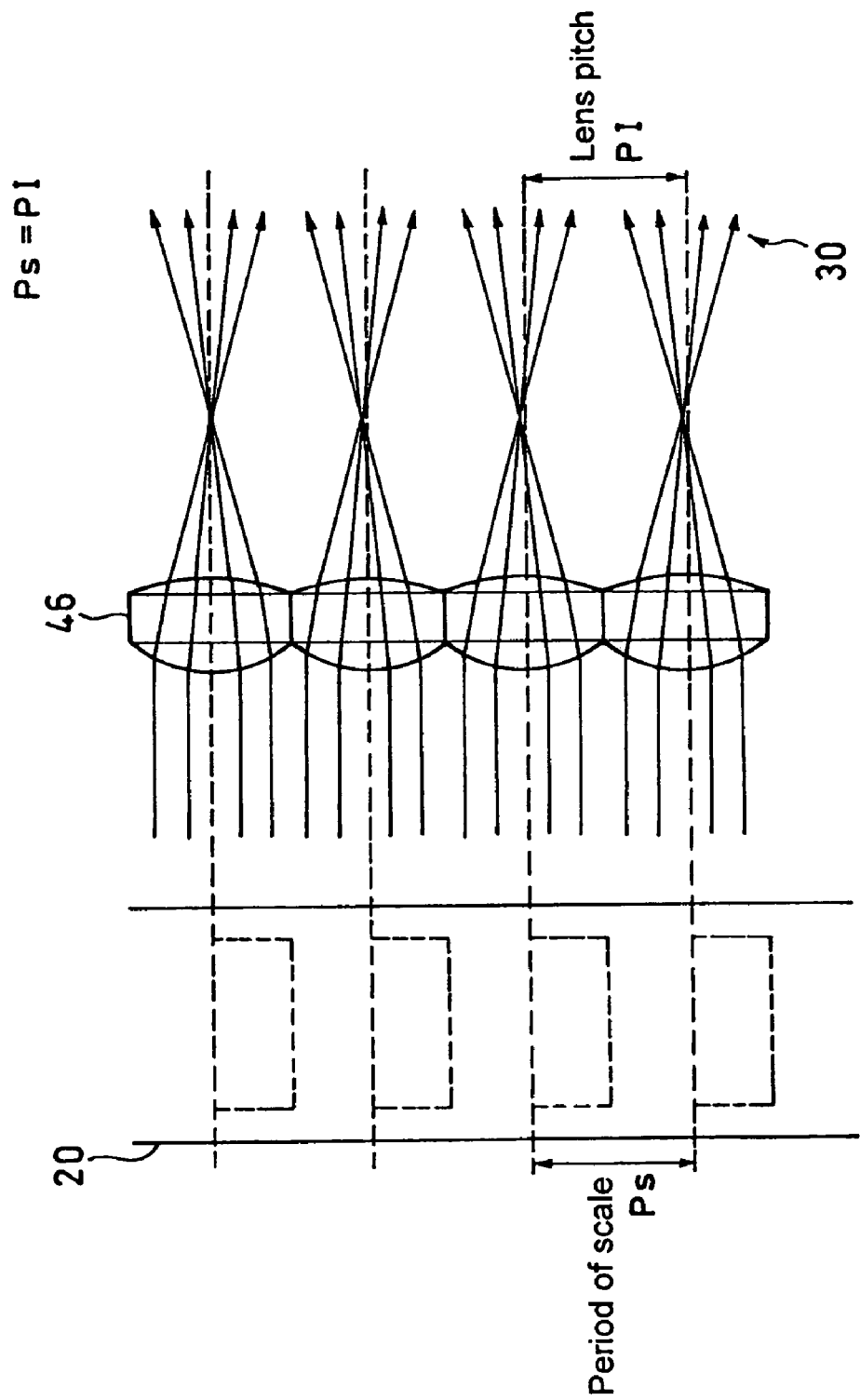
FIG. 6 is a light path view showing essential components of a first embodiment of the present invention.

As shown in FIG. 6, according to a first embodiment of the present invention, an incremental type photoelectric encoder has a lens array 46. The lens array 46 is composed of a plurality of lenses with a set pitch P1 (referred to as "lens pitch") which is brought into agreement with a period Ps of a main scale 20 or natural number multiple thereof.

Figure 7:
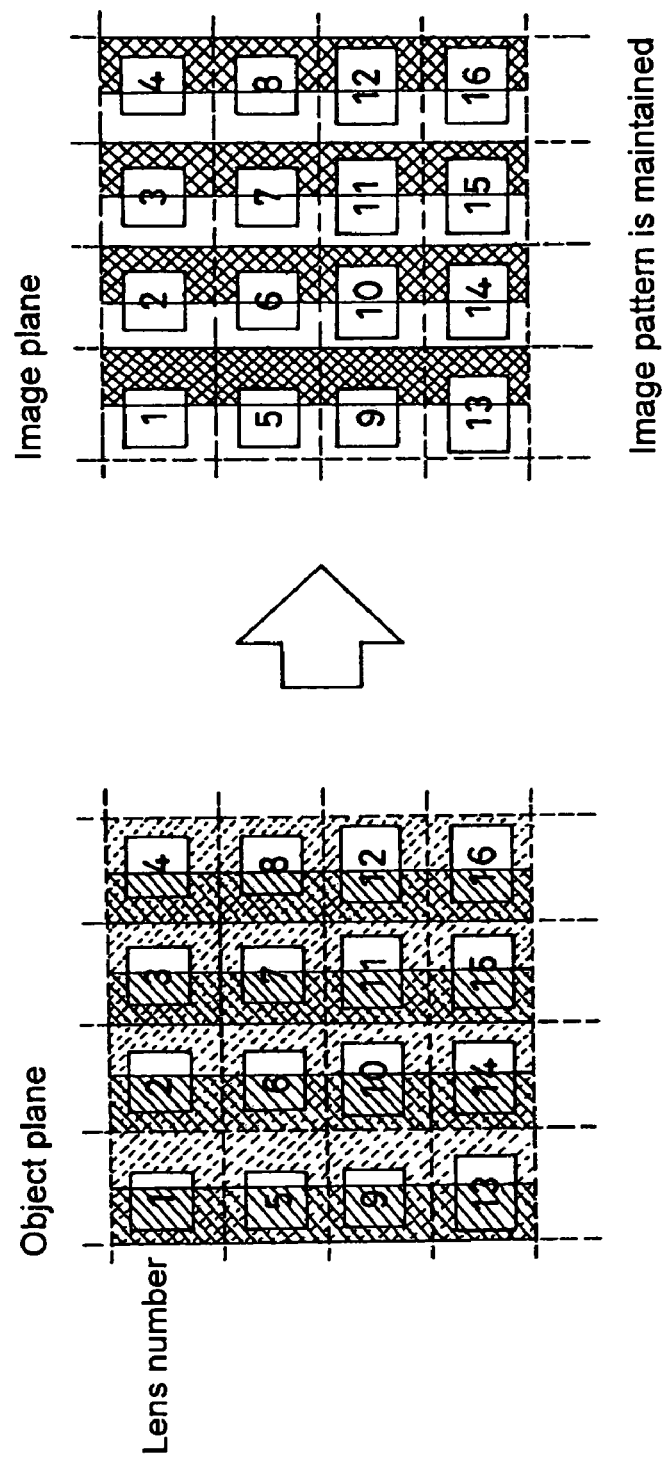
FIG. 7 shows the principle of the present invention.

As shown in FIG. 7, in the present embodiment since the pattern is ensured even if the image is divided and reversed in each separate lens, there is no problem as long as it is used as an incremental type.

Figure 8:
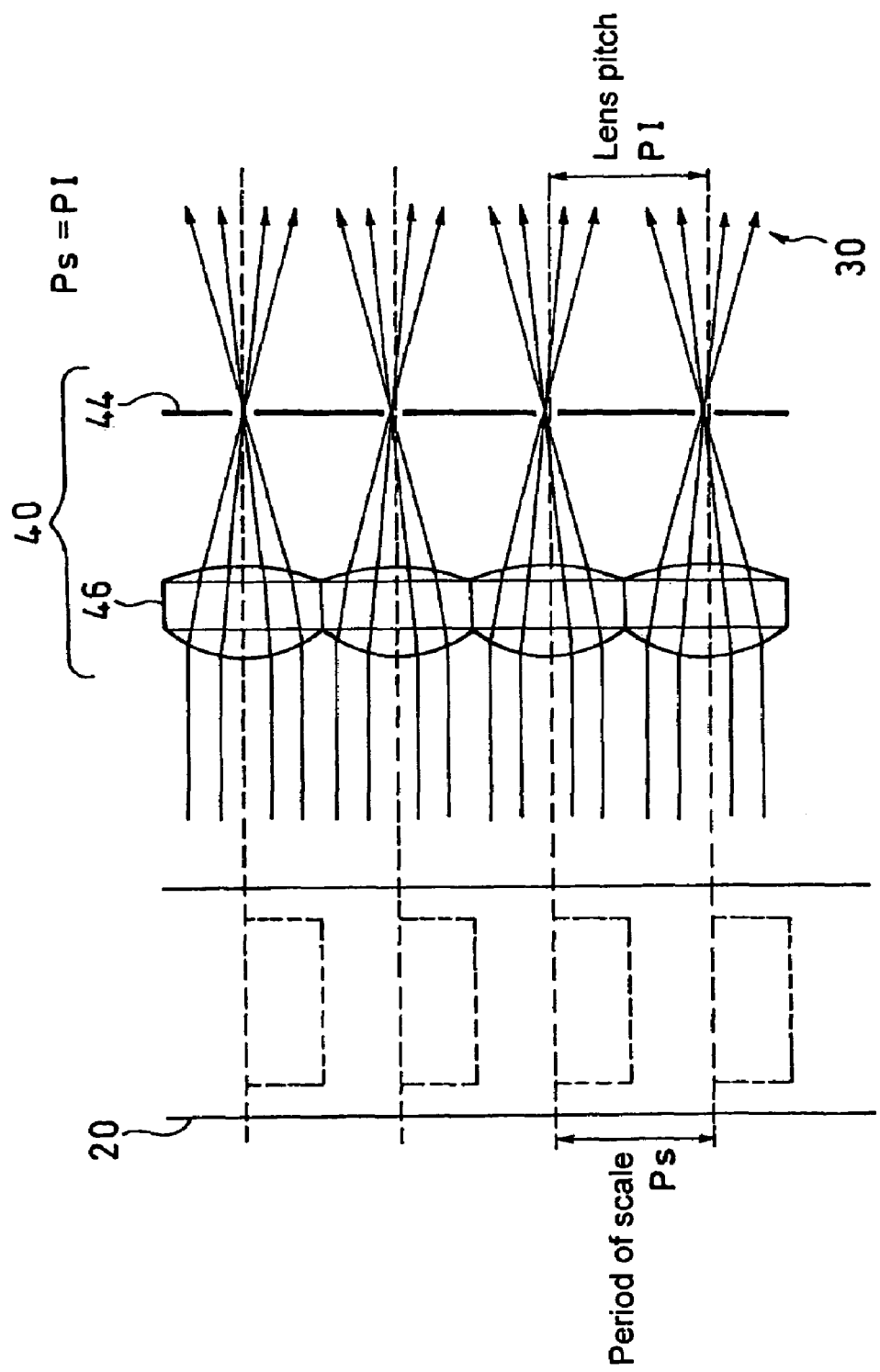
FIG. 8 is a modification of the first embodiment.

Further, as shown in FIG. 8, aperture 44 can be provided at focal point of each lens of the lens allay 46 so as to form a telecentric optical system 40.

Figure 9:
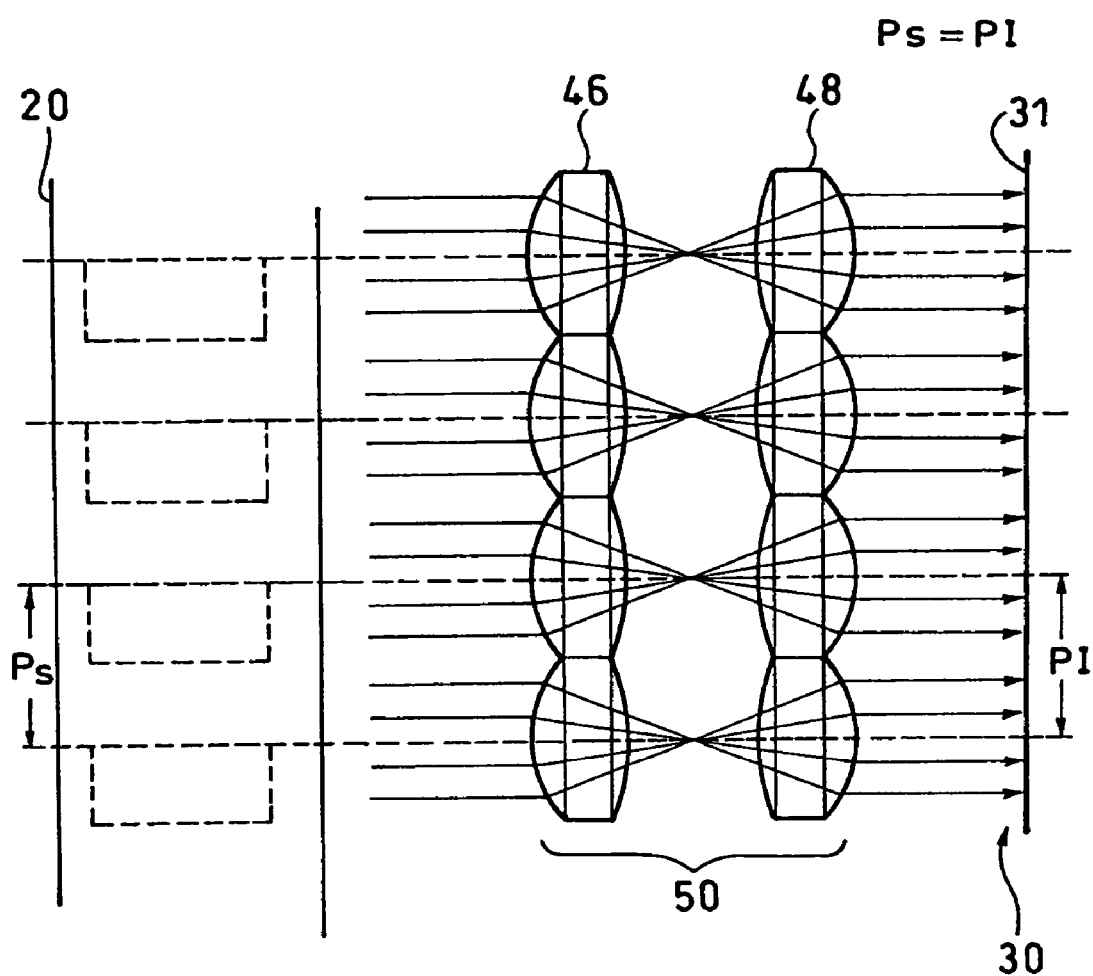
FIG. 9 is a light path view showing essential components of a second embodiment of the present invention.
Figure 10:
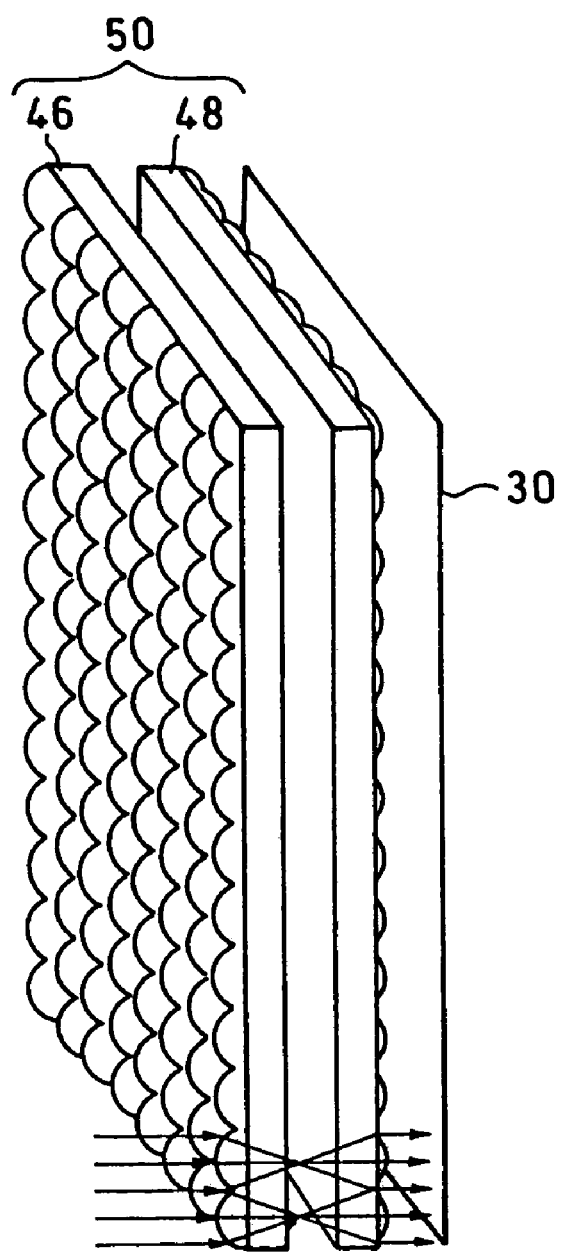
FIG. 10 is a perspective view of FIG. 9.

Next, a second embodiment of the present invention will be described with reference to FIG. 9 (light path view) and FIG. 10 (perspective view).

In the present embodiment, a second lens array 48 identical to the lens array 46 (first lens array) is provided in the reverse direction so as to make the focal points thereof be positioned at the positions where the focal points of the first lens array 46 are located, thereby forming an optical system 50.

In the present embodiment, the lens array 48 is the same as the lens array 46. Because of this, aberrations occurring on the first lens array 46 provided on the input side can be almost completely inversely corrected by the second lens array 48 provided on the output side. Therefore, even if a low-cost lens array with large aberrations is used, the aberrations can be almost completely cancelled and the signal detection efficiency can be greatly improved.

Figure 11:
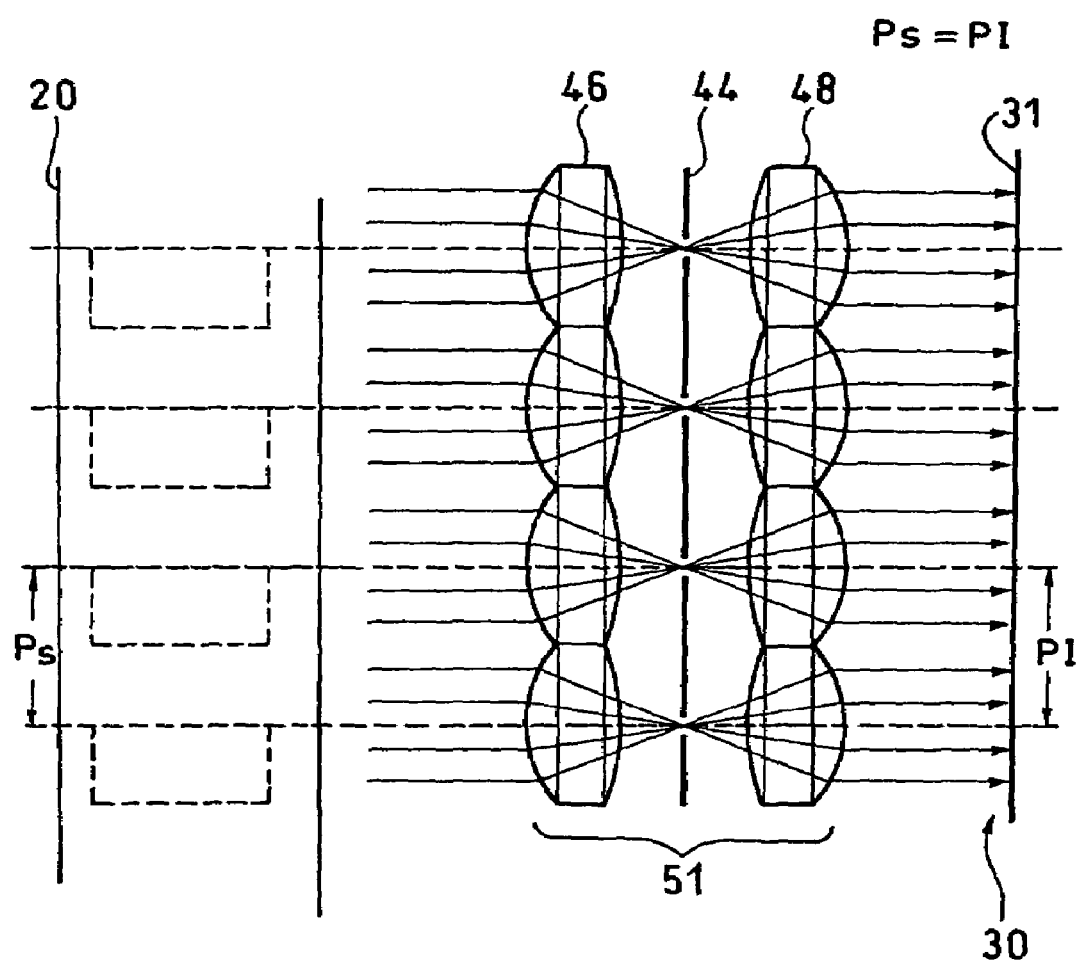
FIG. 11 is a modification of the second embodiment.
Figure 12:
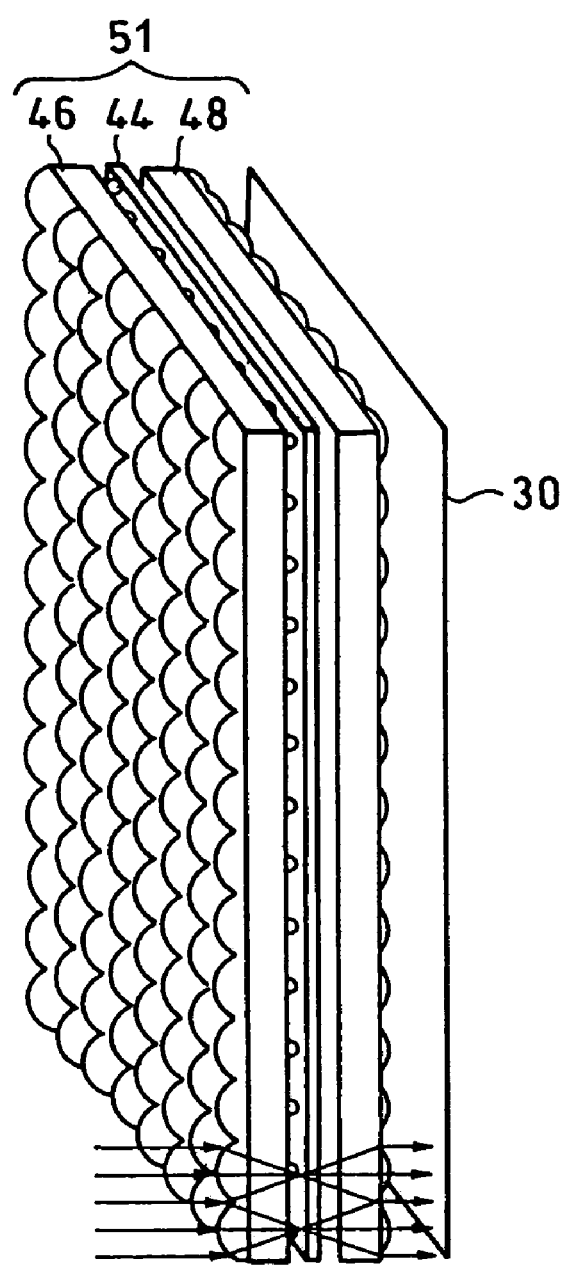
FIG. 12 is a perspective view of FIG. 11.

Further, as shown in FIGS. 11 and 12, aperture 44 can be provided at focal point of each lens of the lens allays 46 and 48 so as to form a bilateral telecentric optical system 51.

Figure 13:
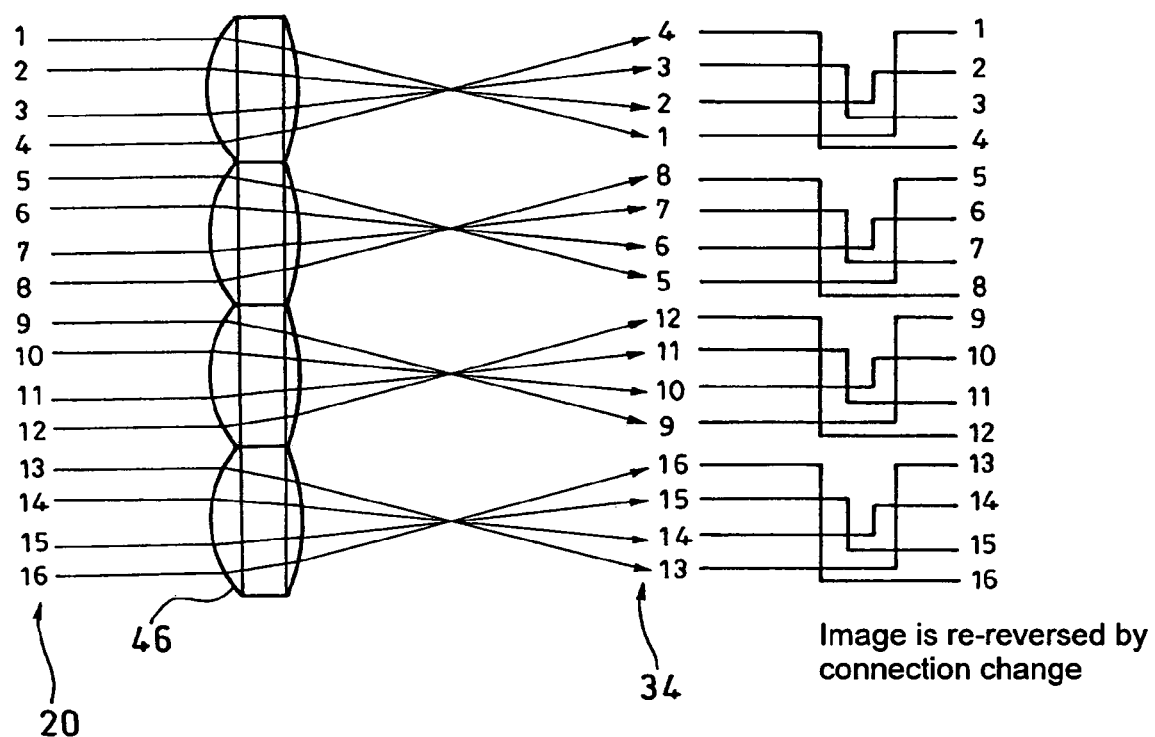
FIG. 13 is a light path view showing essential components of a third embodiment of the present invention.

Next, a third embodiment of the present invention will be described with reference to FIG. 13.

The present embodiment relates to an absolute type photoelectric encoder that has a lens array 46. In this photoelectric encoder, an image is electrically re-reversed by changing the output connection of a light receiving element array 34 by the pixels.

Figure 14:
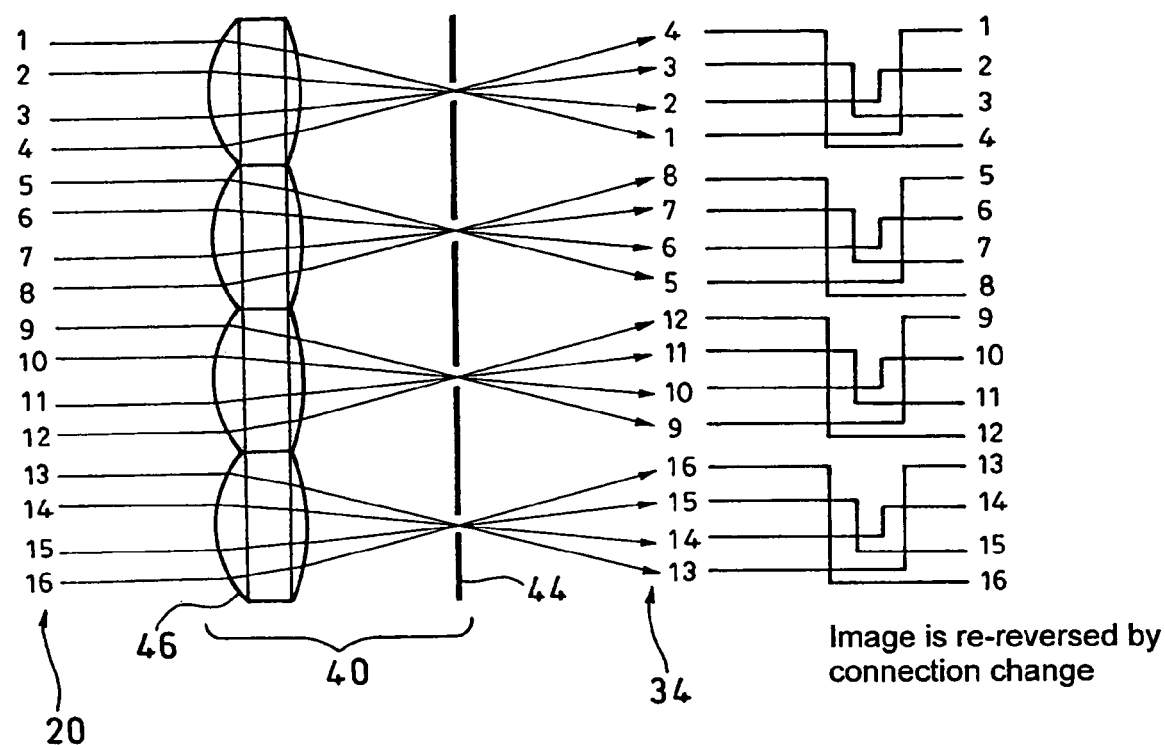
FIG. 14 is a modification of the third embodiment.

Further, as shown in FIG. 14, aperture 44 can be provided at focal point of each lens of the lens allay 46 so as to form a telecentric optical system 40.

Figure 15:
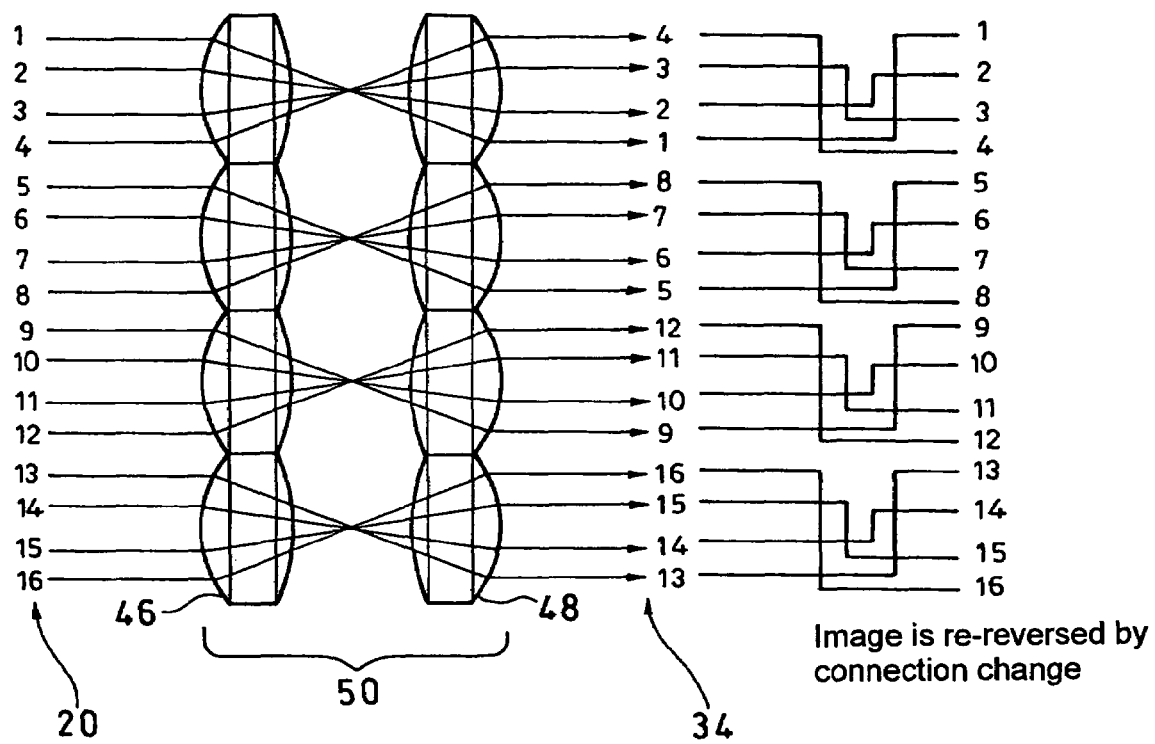
FIG. 15 is a light path view showing essential components of a fourth embodiment of the present invention.

Next, a fourth embodiment of the present invention will be described with reference to FIG. 15.

The present embodiment relates to an absolute type photoelectric encoder that has an optical system 50 composed of lens arrays 46 and 48. In this photoelectric encoder, an image is electrically re-reversed by changing the output connection of a light receiving element array 34 by the pixels.

An absolute type encoder can be realized according to the third and fourth embodiments without forming a complicated optical system.

Figure 16:
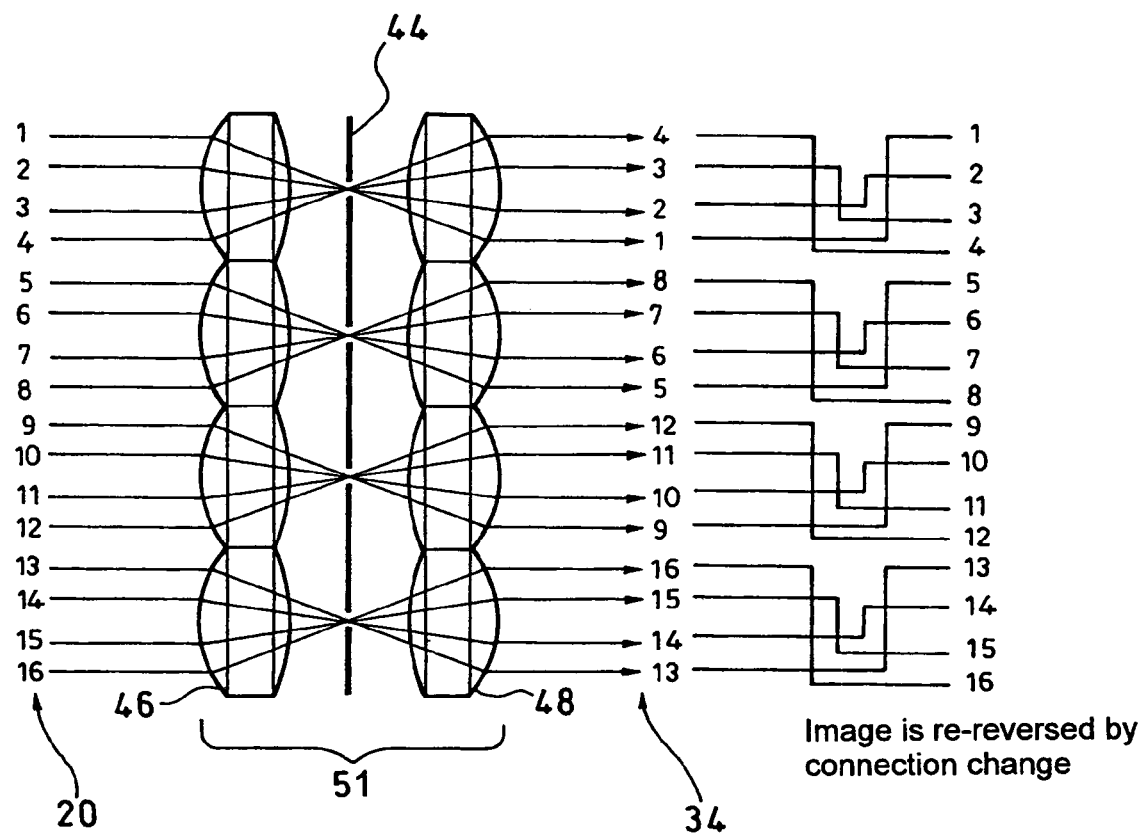
FIG. 16 is a modification of the fourth embodiment.

Further, as shown in FIG. 16, the optical system 50 can be made as a bilateral telecentric optical system 51 which has aperture 44 disposed at focal point of each lens of the lens allays 46 and 48.

Figure 17:
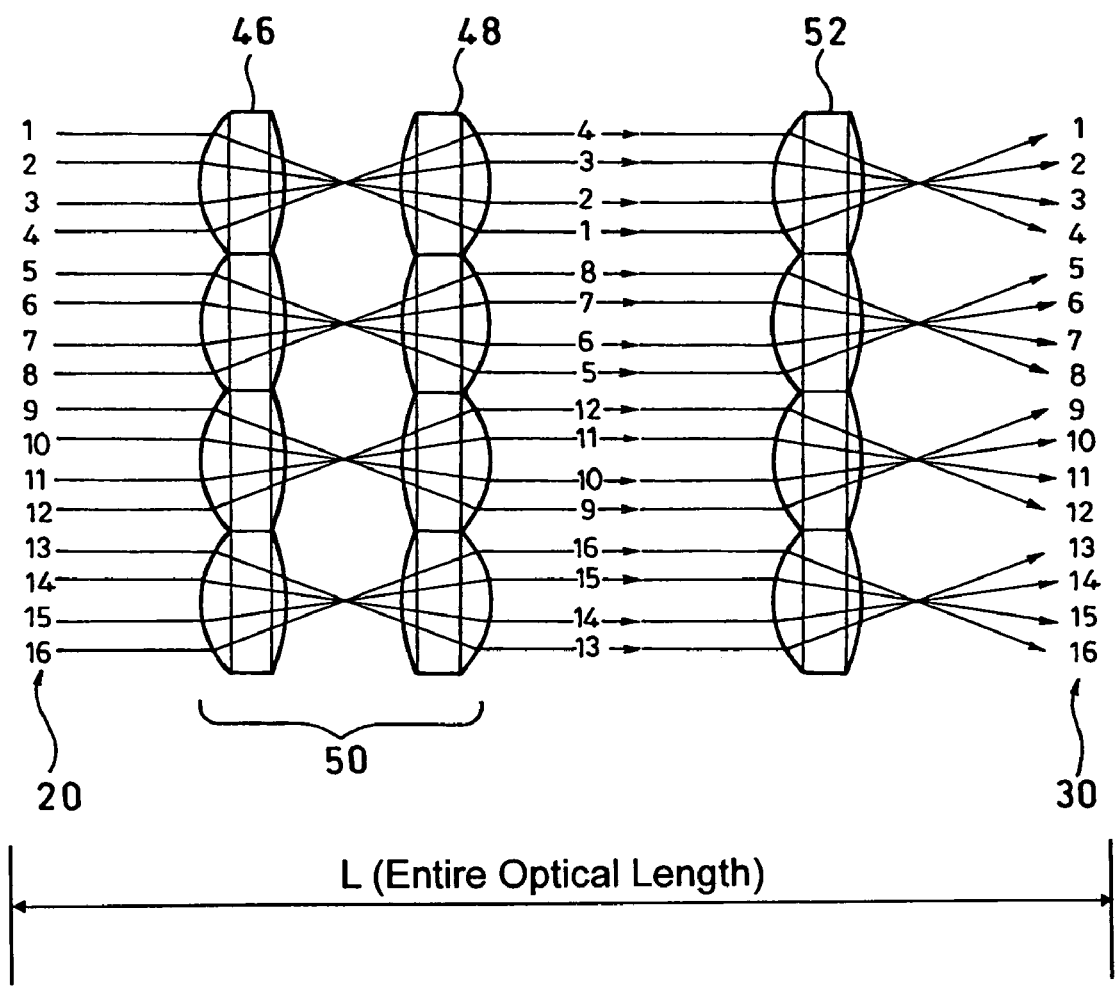
FIG. 17 is a light path view showing essential components of a fifth embodiment of the present invention.

Next, a fifth embodiment of the present invention will be described with reference to FIG. 17.

The present embodiment relates to an absolute type photoelectric encoder that has an optical system 50 composed of lens arrays 46 and 48. This photoelectric encoder is further provided with a third lens array 52 identical to the first and second lens arrays 46 and 48 on the output side of the optical system 50, thereby optically re-reversing an image.

Figure 18:
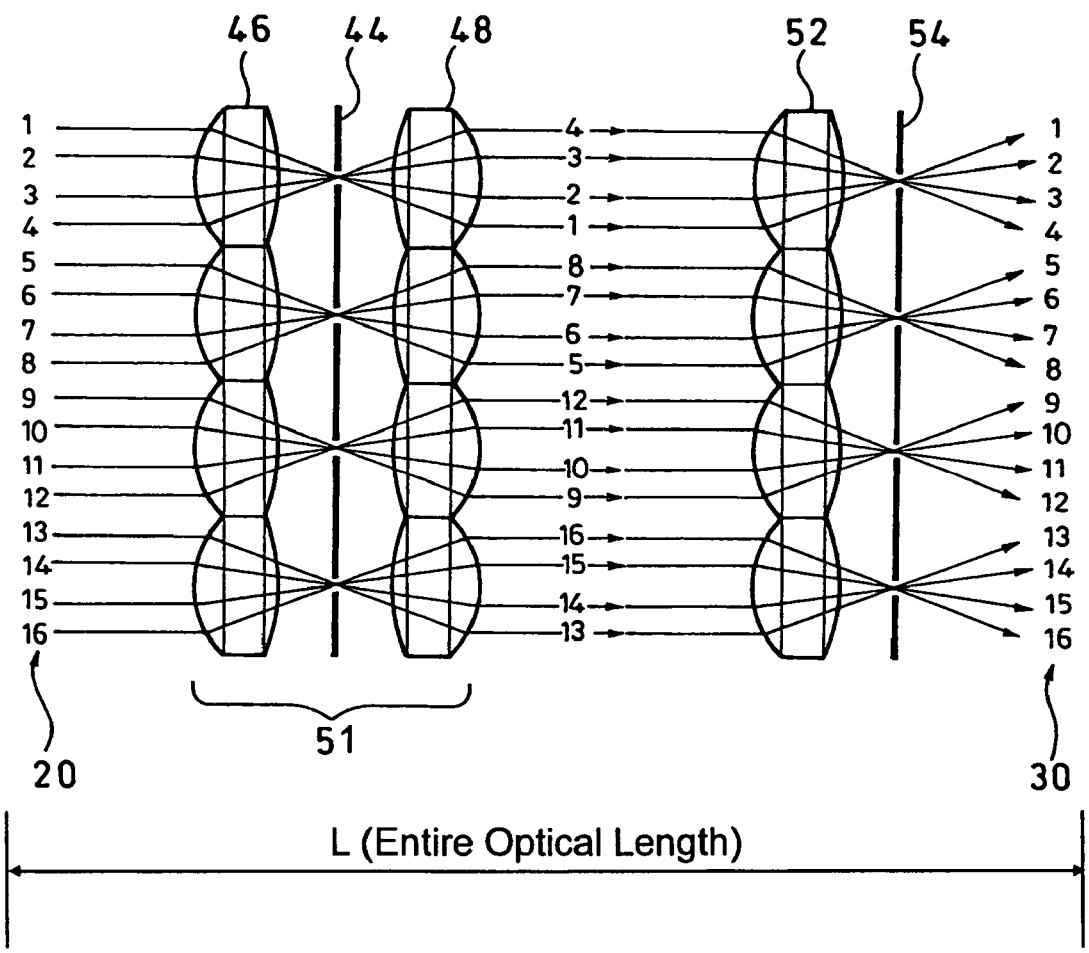
FIG. 18 is a modification of the fifth embodiment.

Further, as shown in FIG. 18, the optical system 50 can be made as a bilateral telecentric optical system 51 which has aperture 44 disposed at focal point of each lens of the lens allays 46 and 48. Further, aperture 54 may be disposed at focal point of each lens of the lens allay 52.

Figure 19:
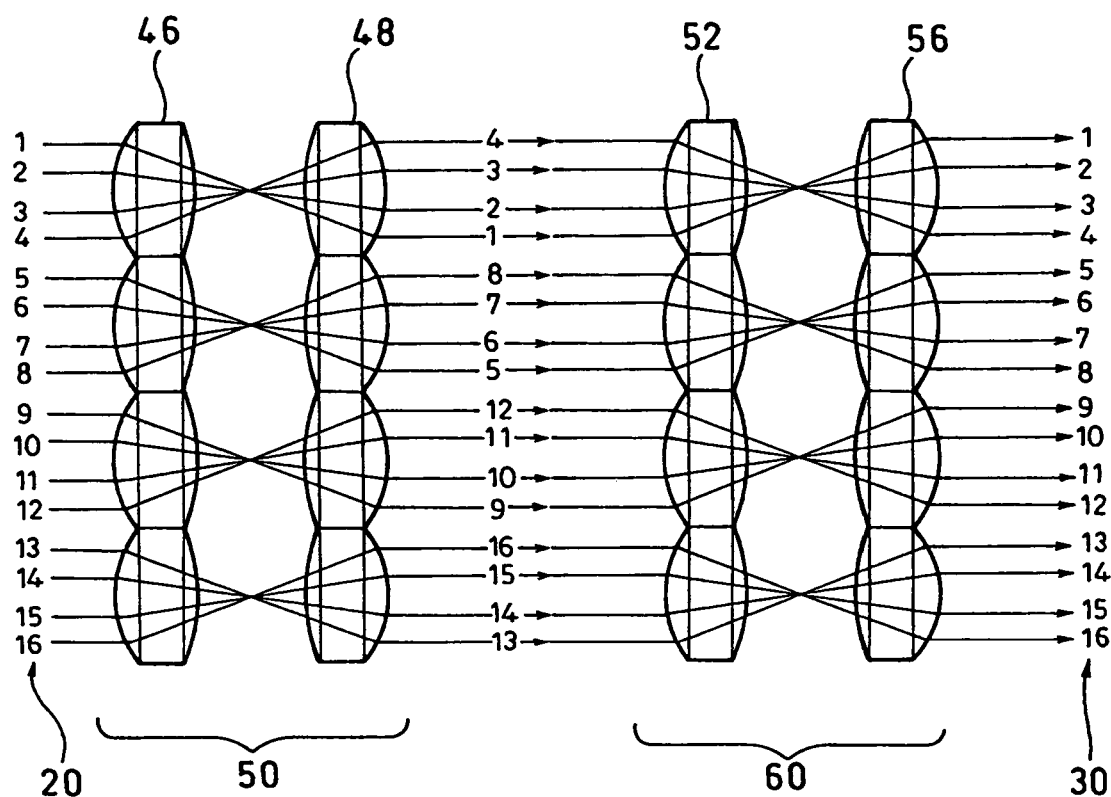
FIG. 19 is a light path view showing essential components of a sixth embodiment of the present invention.

Next, a sixth embodiment of the present invention will be described with reference to FIG. 19.

The present embodiment relates to an absolute type photoelectric encoder that has an optical system 50 composed of lens arrays 46 and 48. This photoelectric encoder is further provided with an optical system 60 on the output side of the optical system 50, thereby optically re-reversing an image. The optical system 60 has the same composition as the optical system 50 and contains a third lens array 52 and a fourth lens array 56.

Because the same optical systems are used on the input side and the output side in this embodiment, the components can be shared.

Figure 20:
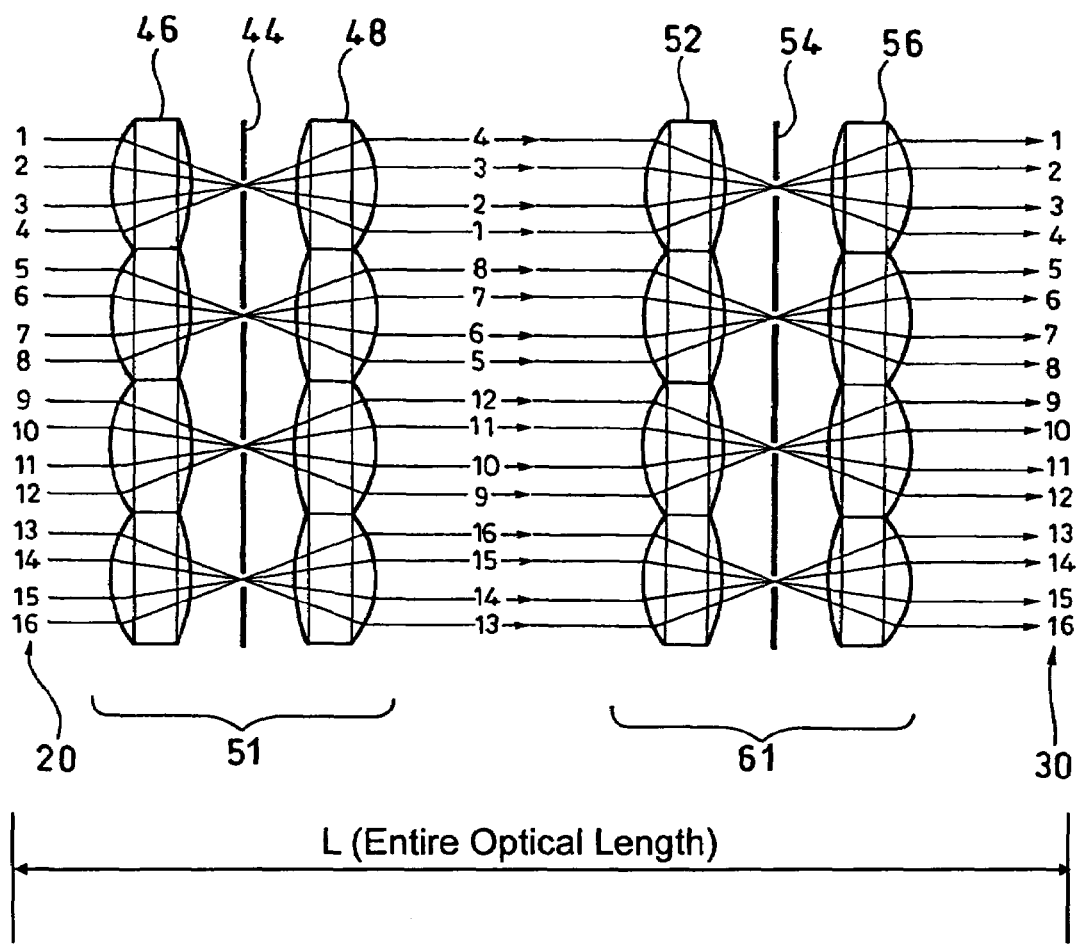
FIG. 20 is a modification of the sixth embodiment.

Further, as shown in FIG. 20, the optical system 50 can be made as a bilateral telecentric optical system 51 which has aperture 44 disposed at focal point of each lens of the lens allays 46 and 48 and the optical system 60 can be made as a bilateral telecnntric optical system 61 which has aperture 54 disposed at focal point of each lens of the lens allays 52 and 56.

Figure 21:
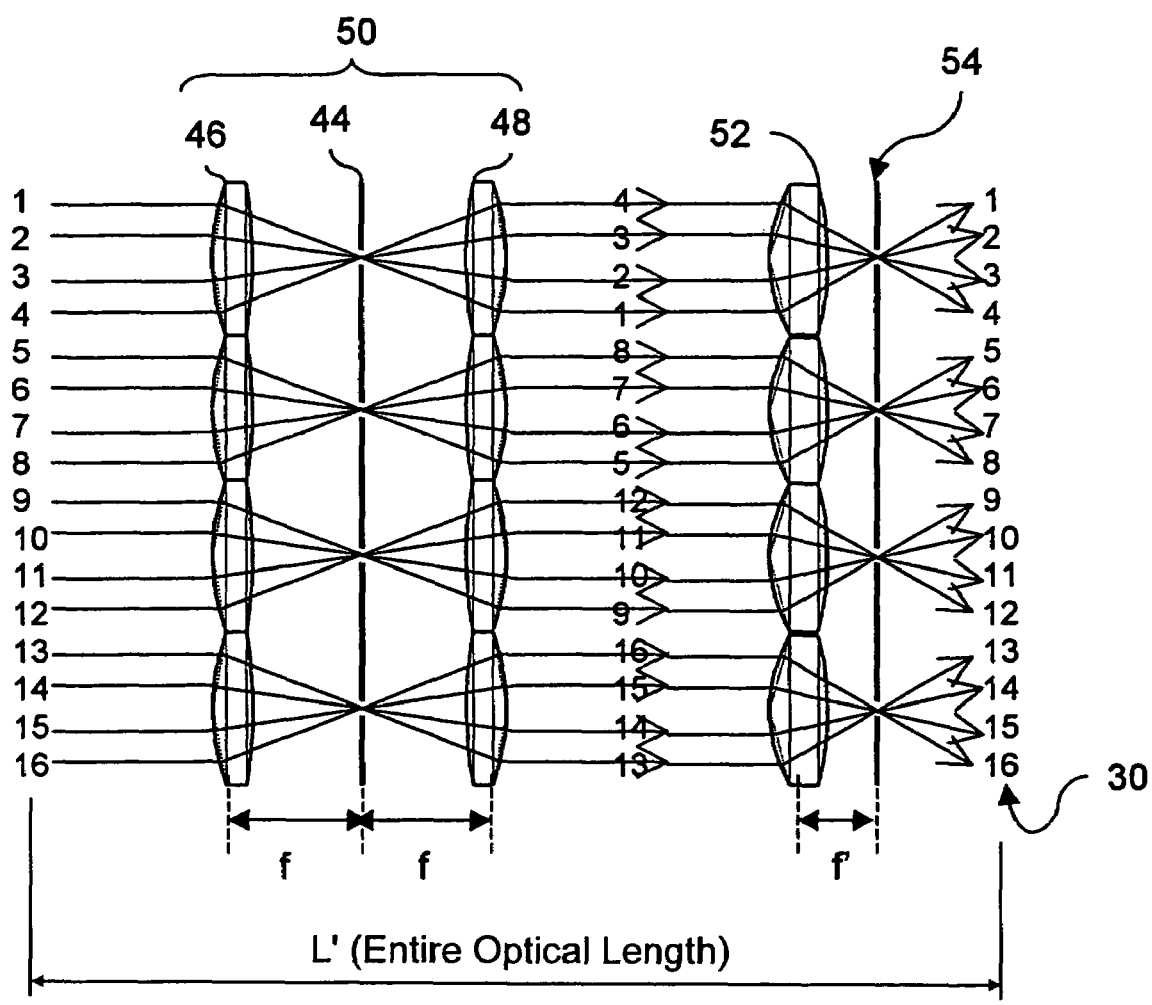
FIG. 21 is a light path view showing essential components of a seventh embodiment of the present invention.

Next, a seventh embodiment of the present invention will be described with reference to FIG. 21.

The present embodiment employs the same photoelectric encoder as that in the fifth embodiment shown in FIG. 18. In this embodiment, the focal length f' of the third lens array 52 is made smaller than the focal length f of the first and second lens arrays 46 and 48, thereby shortening the entire optical length. While ensuring the air gap between the main scale 20 and the input side lens array 46, the size of the photoelectric encoder can be reduced.

In other words, if the distance (equivalent to air gap) between the main scale 20 and the input side lens array 46 is equal to the focal length f of the input side lens array 46, the entire optical length in the seventh embodiment will be L'=4f+4f'<8f and the entire optical length can be shortened in this embodiment. This is in contrast to the entire optical length L nearly equal to 8f when the first to third lens arrays are composed of the same lenses as in the fifth embodiment.

Figure 22:
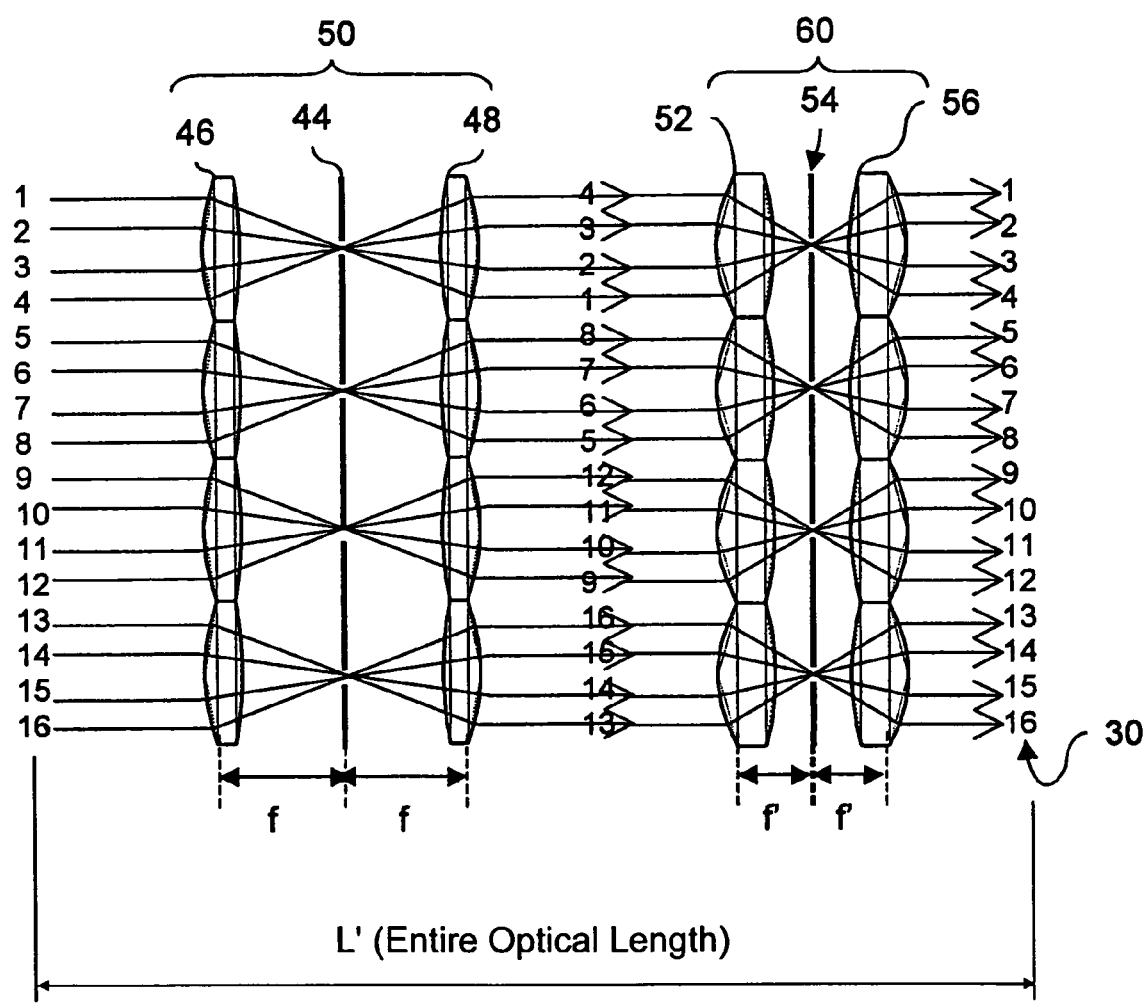
FIG. 22 is a light path view showing essential components of a eighth embodiment of the present invention.

Next, an eighth embodiment of the present invention will be described with reference to FIG. 22.

The present embodiment employs the same photoelectric encoder as that in the sixth embodiment shown in FIG. 20. In this embodiment, the focal length f' of the third and fourth lens arrays 52 and 56 is made smaller than the focal length f of the first and second lens arrays 46 and 48, thereby shortening the entire optical length. While ensuring the air gap between the main scale 20 and the input side lens array 46, the size of the photoelectric encoder can be reduced.

In other words, if the distance (equivalent to air gap) between the main scale 20 and the input side lens array 46 is equal to the focal length f of the input side lens array 46, the entire optical length in the eighth embodiment will be L'=4f+4f'<8f and the entire optical length can be shortened in this embodiment. This is in contrast to the entire optical length L nearly equal to 8f when the first to fourth lens arrays are composed of the same lenses as in the sixth embodiment.

Figure 23:
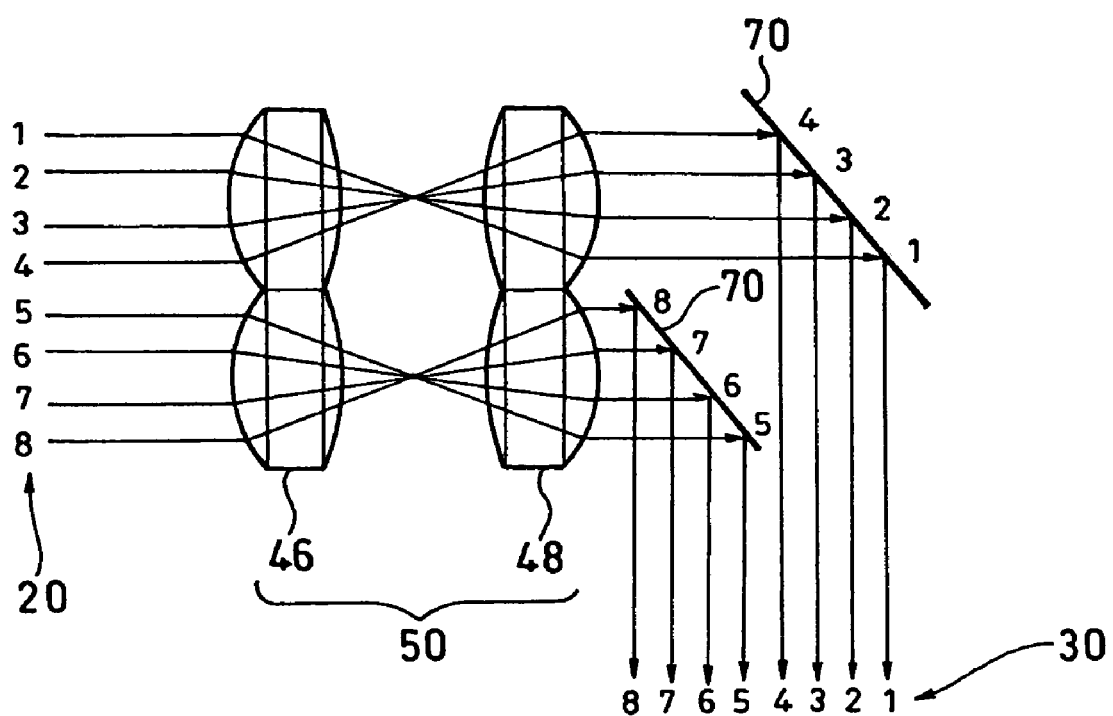
FIG. 23 is a light path view showing essential components of a ninth embodiment of the present invention.

Next, a ninth embodiment of the present invention will be described with reference to FIG. 23.

The present embodiment relates to an absolute type photoelectric encoder that has an optical system 50 composed of lens arrays 46 and 48. This photoelectric encoder is further provided with a plurality of small mirrors 70, thereby optically re-reversing an image. The small mirrors 70 are arranged with a set pitch identical to each lens of the lens arrays 46 and 48.

Figure 24:
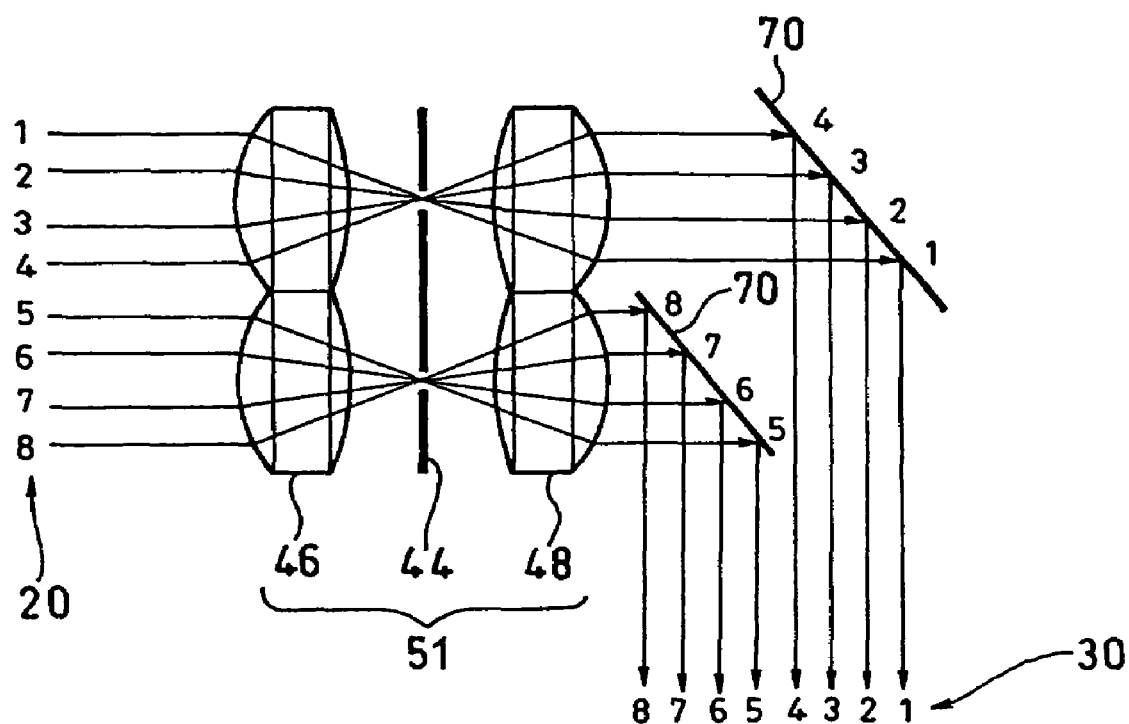
FIG. 24 is a modification of the ninth embodiment.

Further, as shown in FIG. 24, the optical system 50 can be made as a bilateral telecntric optical system 51 which has aperture 44 provided at focal point of each lens of the lens allays 46 and 48.

Figure 25:
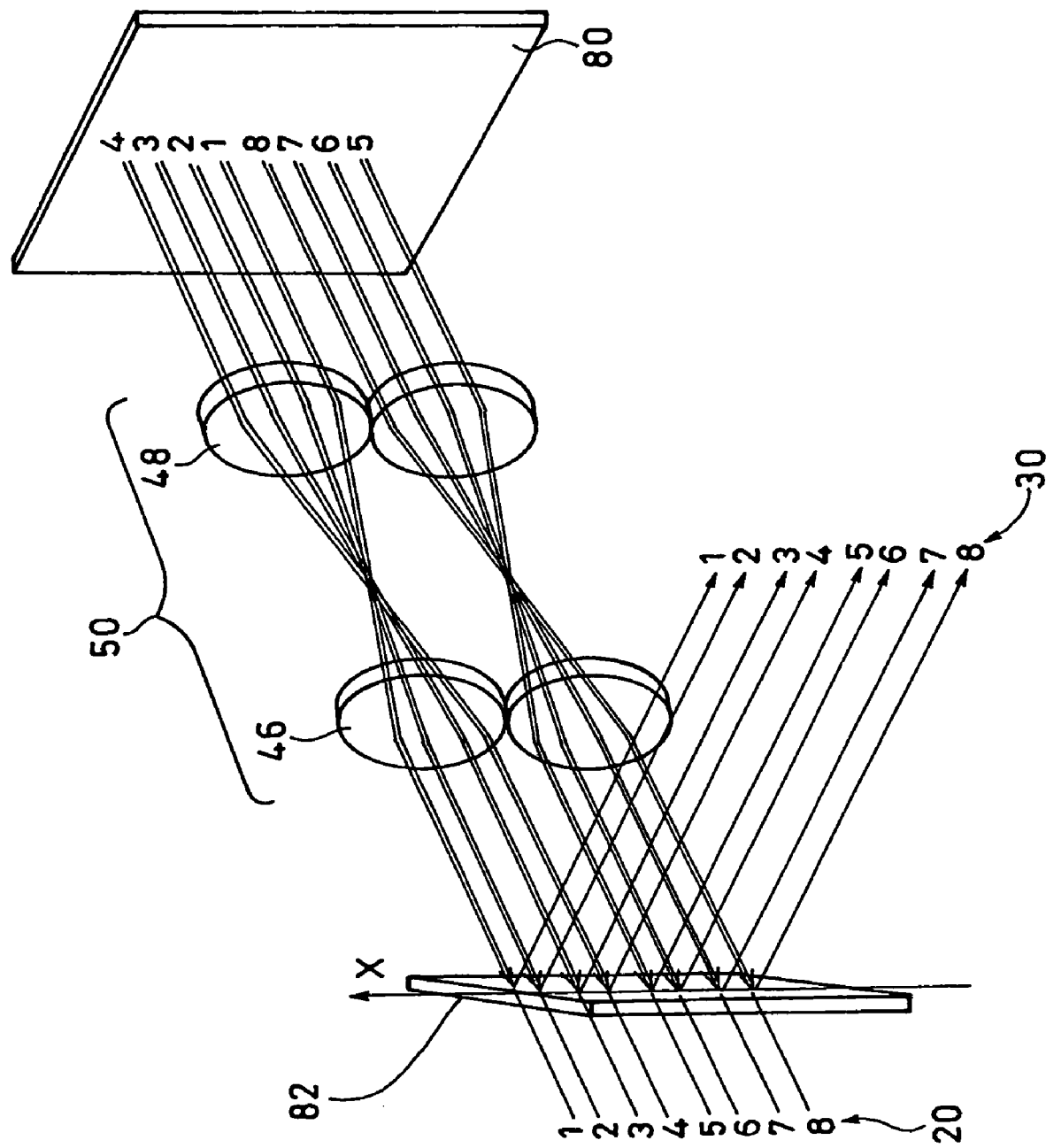
FIG. 25 is a light path view showing essential components of a tenth embodiment of the present invention.

Next, a tenth embodiment of the present invention will be described with reference to FIG. 25.

The present embodiment relates to an absolute type photoelectric encoder that has an optical system 50 composed of lens arrays 46 and 48. This photoelectric encoder is further provided with a mirror 80 and a half mirror 82, thereby optically re-reversing an image. The mirror 80 functions to reflect light emitted from the output side of the lens array 48 towards the optical system 50 for re-entering. The half mirror 82 functions to extract light that has passed through the optical system 50 two times towards a light receiving array 34.

Figure 26:
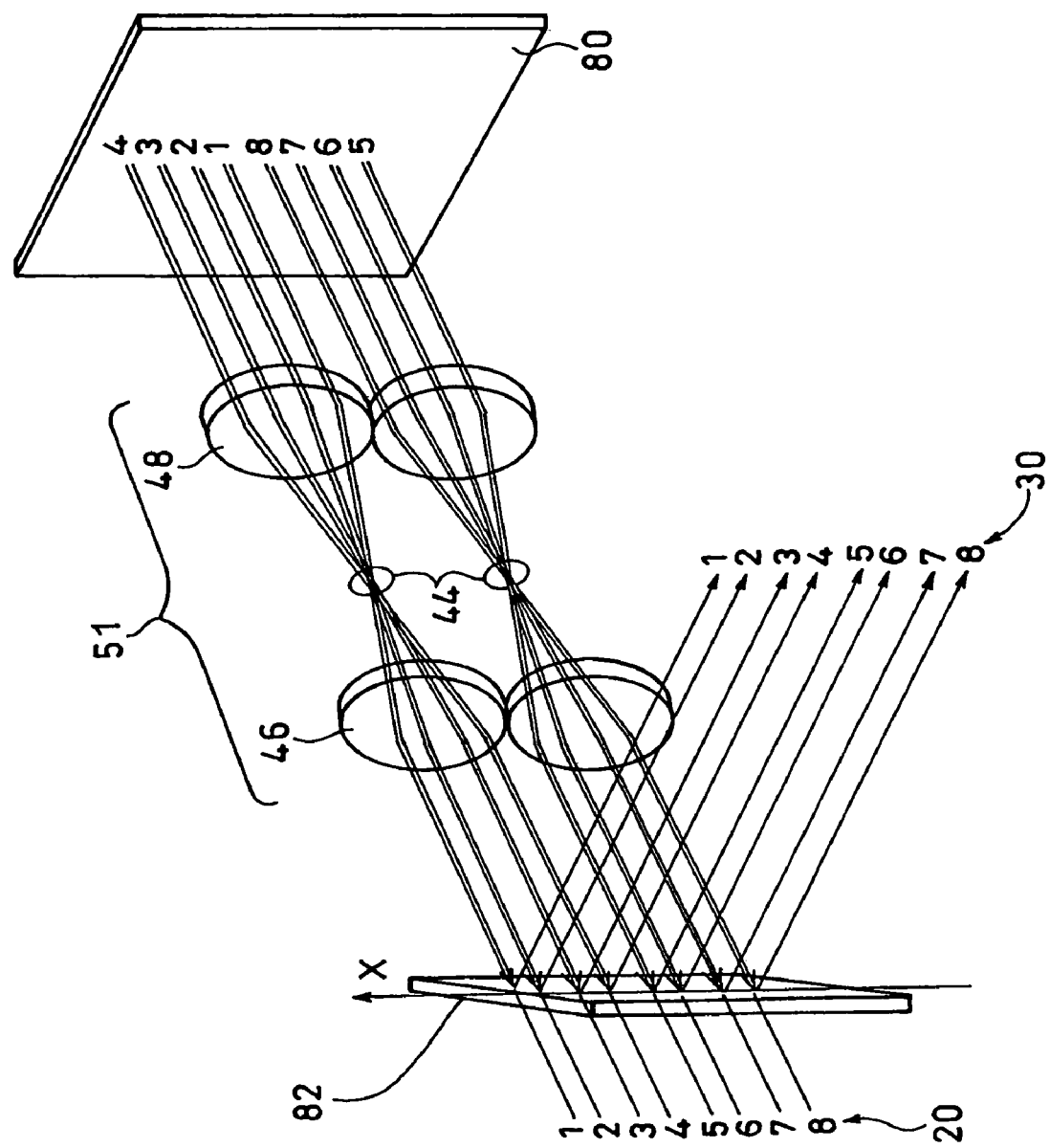
FIG. 26 is a modification of the tenth embodiment.

Further, as shown in FIG. 26, the optical system 50 can be made as a bilateral telecentric optical system 51 which has aperture 44 provided at focal point of each lens of the lens allays 46 and 48.

Not only can the third to tenth embodiments be applied to an absolute type but also to an incremental type.

The present invention can be applied to a photoelectric encoder with separately formed index grid and light receiving element as well as to a photoelectric encoder that has a light receiving element integrally formed with these. Furthermore, not only can the present invention be applied to a transmission type encoder but also to a reflecting type encoder.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. An incremental type photoelectric encoder having an optical system including a first lens array inserted between a main scale and a light receiving element, and
   wherein pitches of the respective lenses are brought into agreement with a period of the main scale or natural number multiple thereof.

2. The photoelectric encoder according to claim 1 wherein an aperture is inserted at focal position of at least one lens of the lens array.

3. The photoelectric encoder according to claim 1 wherein the lens array is a two-dimensional lens array.

4. A photoelectric encoder having an optical system including a first lens array inserted between a main scale and a light receiving element, and
   wherein a second lens array with a set pitch of lenses identical to the first lens array and a third lens array that optically re-reverses the light emitted from the second lens array are provided.

5. The photoelectric encoder according to claim 4 wherein a fourth lens array is provided on an output side of the third lens array.

6. The photoelectric encoder according to claim 5 wherein the optical system constituted by the first lens array and the second lens array has the same composition as the optical system constituted by the third lens array and the fourth lens array.

7. The photoelectric encoder according to claim 6, wherein a focal length of each lens of the third lens array is smaller than a focal length of each lens of the first and second lens array.

8. The photoelectric encoder according to claim 5, wherein a focal length of each lens of the third lens array is smaller than a focal length of each lens of the first and second lens array.

9. The photoelectric encoder according to claim 4 wherein a focal length of each lens of the third lens array is smaller than a focal length of each lens of the first and second lens array.

10. A photoelectric encoder having an optical system including a first lens array inserted between a main scale and a light receiving element, wherein the light receiving element includes a light receiving element array having outputs, and
    wherein the order of connection of the outputs of the light receiving element array is changed to electrically re-reverse an image that has been divided and reversed by the first lens array.

11. A photoelectric encoder having an optical system including a first lens array inserted between a main scale and a light receiving element, and
    wherein a second lens array with a set pitch of lenses identical to the first lens array, and a plurality of small mirrors with a set pitch identical to that of respective lenses of the lens arrays are provided to optically re-reverse an image that has been divided and reversed by the first lens array, by the small mirrors.

12. A photoelectric encoder having an optical system including a first lens array inserted between a main scale and a light receiving element, and
wherein
a second lens array with a set pitch of lenses identical to the first lens array, a mirror for making light emitted from the second lens array again be incident on the second lens array, and a half mirror for extracting the light passing through the second lens array twice towards a direction of the light receiving element are provided to optically re-reverse an image that has been divided and reversed by the first lens array, by the mirror.

* * * * *